United States Patent
Forbes-Robinson et al.

[11] Patent Number: 5,992,863
[45] Date of Patent: Nov. 30, 1999

[54] STEERING ASSEMBLY HAVING AN ADJUSTABLE ALIGNMENT ARRANGEMENT

[75] Inventors: Elliott Forbes-Robinson, Sherrills Ford; Rudolph H. Zeck, Harrisburg, both of N.C.

[73] Assignee: 600 Racing, Inc., Concord, N.C.

[21] Appl. No.: 09/040,767

[22] Filed: Mar. 18, 1998

[51] Int. Cl.$^6$ ................................................ B60G 1/00
[52] U.S. Cl. ............................ 280/86.751; 280/86.757
[58] Field of Search ................... 280/86.751, 86.757, 280/93.512, 86.75

[56] References Cited

U.S. PATENT DOCUMENTS

| | | |
|---|---|---|
| 1,642,640 | 9/1927 | Bouch et al. . |
| 1,766,506 | 6/1930 | Delpini . |
| 2,115,915 | 5/1938 | McCain . |
| 2,115,919 | 5/1938 | Slack . |
| 2,153,862 | 4/1939 | Cowles . |
| 2,566,565 | 9/1951 | Hill . |
| 2,605,118 | 7/1952 | Booth et al. . |
| 2,882,066 | 4/1959 | Petrak ..................................... 280/96.2 |
| 2,890,893 | 6/1959 | Laukhuff . |
| 3,008,727 | 11/1961 | Akutowicz . |
| 3,147,025 | 9/1964 | Good . |
| 3,285,622 | 11/1966 | Castoe . |
| 3,480,100 | 11/1969 | Gaulke . |
| 3,608,925 | 9/1971 | Murphy . |
| 3,768,585 | 10/1973 | Matteo . |
| 3,819,202 | 6/1974 | Castoe ..................................... 280/96.2 |
| 3,829,117 | 8/1974 | Park . |
| 4,243,339 | 1/1981 | Dickerson . |
| 4,336,953 | 6/1982 | Low . |
| 4,371,191 | 2/1983 | Goldberg et al. . |
| 4,460,197 | 7/1984 | Rogers . |
| 4,650,208 | 3/1987 | Mason . |
| 4,693,487 | 9/1987 | Cooper . |
| 4,700,972 | 10/1987 | Young . |
| 4,718,686 | 1/1988 | Dziuba et al. . |
| 4,795,187 | 1/1989 | Ingalls . |
| 4,867,472 | 9/1989 | Ward ........................................ 280/661 |
| 4,896,899 | 1/1990 | Lawrence . |
| 5,121,809 | 6/1992 | Sbarro . |
| 5,246,245 | 9/1993 | Sato et al. . |
| 5,316,332 | 5/1994 | Ingalls . |
| 5,326,121 | 7/1994 | Fisher . |
| 5,364,114 | 11/1994 | Peterson . |
| 5,443,281 | 8/1995 | Burkard et al. . |
| 5,454,153 | 10/1995 | Noel . |
| 5,588,660 | 12/1996 | Paddison . |

*Primary Examiner*—Christopher P. Ellis
*Assistant Examiner*—David R. Dunn
*Attorney, Agent, or Firm*—Alston & Bird LLP

[57] ABSTRACT

A steering assembly for a vehicle such as a racing vehicle wherein the camber, caster and the suspension height are readily adjustable. The steering assembly includes a steering arrangement and an alignment arrangement. The alignment arrangement includes a steering spindle having a tire axle for supporting a tire. The steering spindle defines a bore for receiving a kingpin. The steering spindle is connected to a mounting bracket by a pair of stems. The stems each are connected at one end to a second joint positioned above or below the steering spindle. The length of the stem between the mounting bracket and the second joint may be adjusted to alter the camber of the tire axle by displacing the central axis of the kingpin. The position of at least one of the stems may be altered in a horizontal direction to adjust the caster of the alignment arrangement. A plurality of spacers are selectively positioned between the steering spindle and the upper or lower second joint to provide variant suspension height positions of the steering spindle along the length of the kingpin.

34 Claims, 4 Drawing Sheets

STEERING ASSEMBLY HAVING AN ADJUSTABLE ALIGNMENT ARRANGEMENT

FIELD OF THE INVENTION

The present invention is directed to a steering assembly for a motor vehicle having an adjustable alignment arrangement wherein the camber, the caster and the suspension height of the vehicle tires are readily adjustable.

BACKGROUND OF THE INVENTION

Maximum performance of a motor vehicle, such as, for example, a racing vehicle, is achieved, at least in part, by maximizing the tire traction of the vehicle. This is particularly important for optimizing cornering performance of the motor vehicle. The size of the surface area of contact between the tires and the road, the amount of time of that the tires contact the road, and the loading of the tires are important parameters for achieving optimal driving performance. These parameters may be met by providing the vehicle tires with the desired camber, caster and suspension height for the given conditions. Suspension height is the distance measured from some specific point on the body, frame, or suspension to the ground. Camber is the amount that the vehicle tires tilt in (negative) or out (positive) at the top, when viewed from the front of the vehicle. Caster is the angle formed by the forward (negative) or rearward (positive) tilt of the steering axis from the vertical axis. The camber adjustment occurs in a first plane whereas the caster adjustment occurs in a second plane, generally transverse to the first plane, albeit both adjustments are measured relative to the vertical axis. The camber, caster and the suspension height may therefore be adjusted to achieve optimal driving performance.

The optimal conditions for a vehicle alignment system may vary, however, from instance to instance. For example, the preferred alignment system may vary from one car to another, from one course to another and even from one day to another due to varying external conditions. The desired characteristics of the system may vary, for instance, because of changes in the surface from surface damage, rubber and oil accumulation, weather conditions, etc. It is therefore desired to provide a vehicle alignment system permitting easy and ready adjustment of steering parameters such as suspension height, caster and camber which may be performed without excessive specialized equipment and at any location, even at a race track before or during an automobile race.

SUMMARY OF THE INVENTION

It is an object of the present invention to provide a steering assembly having a steering alignment arrangement for accurately adjusting the camber, caster and suspension height of the vehicle tires.

It is another object of the present invention to permit such adjustments easily and quickly without requiring specialized equipment so that the adjustments may be made at remote locations such as at or during an automobile race.

The steering assembly of the present invention includes a steering arrangement and a steering alignment arrangement. The steering arrangement may be of any known form. For example, the steering arrangement illustrated includes a steering column which supports a steering wheel at its upper end and which terminates at a universal joint located at its lower end. The universal joint connects the steering column to a gear mechanism which translates the rotational movement applied to the steering wheel to tie rods for turning the wheels. The tie rods extend from each side of the gear mechanism and connect to the steering alignment arrangement. As the steering wheel is turned, the tie rods move the rotating arms of the steering alignment arrangement, which turn the tires in or out for steering. It is within the scope of the present invention, however, to utilize any steering arrangement.

The steering alignment arrangement provided preferably operates on at least a pair of vehicle tires, such as the front tires. Each side of the steering alignment arrangement includes a joint connected to the associated rotating arm, a mounting bracket, a steering spindle, a kingpin, and a tire axle for supporting the vehicle tire. Preferably, each side of the steering alignment arrangement is substantially identical, albeit like parts may be right or left handed. Therefore, in the discussion which follows, one side will be described and it is to be appreciated that the description may apply to both sides of the steering alignment arrangement. The steering spindle is connected to the rotating arm and a vehicle tire axle extends outwardly from the steering spindle for supporting the vehicle tire. The steering spindle defines a central bore for receiving the kingpin.

The mounting bracket, in the form of a plate, is mounted to the chassis of the vehicle. At least one, and preferably a pair, of spherical rod end joints commonly referred to as heim joints are positioned adjacent the upper and lower ends of the steering spindle. The heim joints each define an aperture co-axially aligned with the steering spindle central bore for receiving the kingpin. A stem extends from the respective heim joint. The mounting bracket includes at least one, and preferably two apertures, one of which is an adjustable seat for receipt of the stem positioned adjacent its upper end and one positioned adjacent its lower end. In the illustrated embodiment, the mounting bracket adjustable seat is an elongate aperture. Each stem associated with the heim joints extends through a respective mounting bracket aperture. A securing member is provided for each stem and preferably includes a pair of securing members, one of each pair being positioned on opposing sides of the is mounting bracket to secure each of the heim joints in position relative to the bracket.

The camber of the tires is adjusted by adjusting the angle of the kingpin relative to the vertical axis (or relative to the mounting bracket). The angular position of the kingpin is adjusted by lengthening or shortening the length of the stem between the mounting bracket and the associated heim joint. Positive camber can be achieved by extending the upper stem to lengthen the distance between the mounting bracket and the upper heim joint and, preferably, retracting the lower stem through the lower bracket aperture to shorten the distance between the mounting bracket and the lower heim joint. Once the desired camber is achieved, the securing members are secured to maintain the selected position. Negative camber can be achieved by tilting the kingpin in the opposite direction wherein the upper stem is retracted within the upper bracket aperture and the lower stem is extended.

The caster of the tires is adjusted by moving at least one stem, such as the upper stem, within the upper elongate aperture of the mounting bracket. According to a preferred embodiment of the present invention, the elongate aperture forming the adjustable seat is substantially kidney-shaped with an arcuate top and bottom with the concavity of the top and bottom facing downward. This thereby maintains a predetermined distance between the upper and lower stems to permit proper caster adjustment.

At least one spacer is provided for selectively adjusting the suspension height of the tire axle by altering the vertical distance between the steering spindle and the upper and/or lower heim joint. Preferably, a plurality of spacers are provided. The spacers each define a central aperture and, as illustrated in the drawings, are in the form of a washer for also receiving the kingpin. Thus, the kingpin extends through the central bore of the heim joint, the spacer aperture, and the steering spindle bore. The spacers may be positioned between the steering spindle and the upper heim joint and between the steering spindle and the lower heim joint. A plurality of spacers permit variable suspension height adjustments. Accordingly, the suspension height may be adjusted without specialized equipment and may be easily adjusted.

BRIEF DESCRIPTION OF THE DRAWINGS

The foregoing and other objects, features, and advantages of the present invention will be made apparent from the following detailed description of the preferred embodiment of the invention and from the drawings, in which.

DETAILED DESCRIPTION OF THE INVENTION

The present invention will now be described more fully in detail with reference to the accompanying drawings, in which a preferred embodiment of the invention is shown. This invention should not, however, be construed as limited to the embodiment set forth herein; rather, it is provided so that this disclosure will be thorough and complete and will fully convey the scope of the invention to those skilled in the art.

A steering assembly, shown generally at 10, according to the present invention, broadly includes a steering arrangement 11 and a steering alignment arrangement 12 wherein the steering alignment arrangement 12 provides the vehicle tire with an adjustable camber, caster and suspension height.

Figure 1:
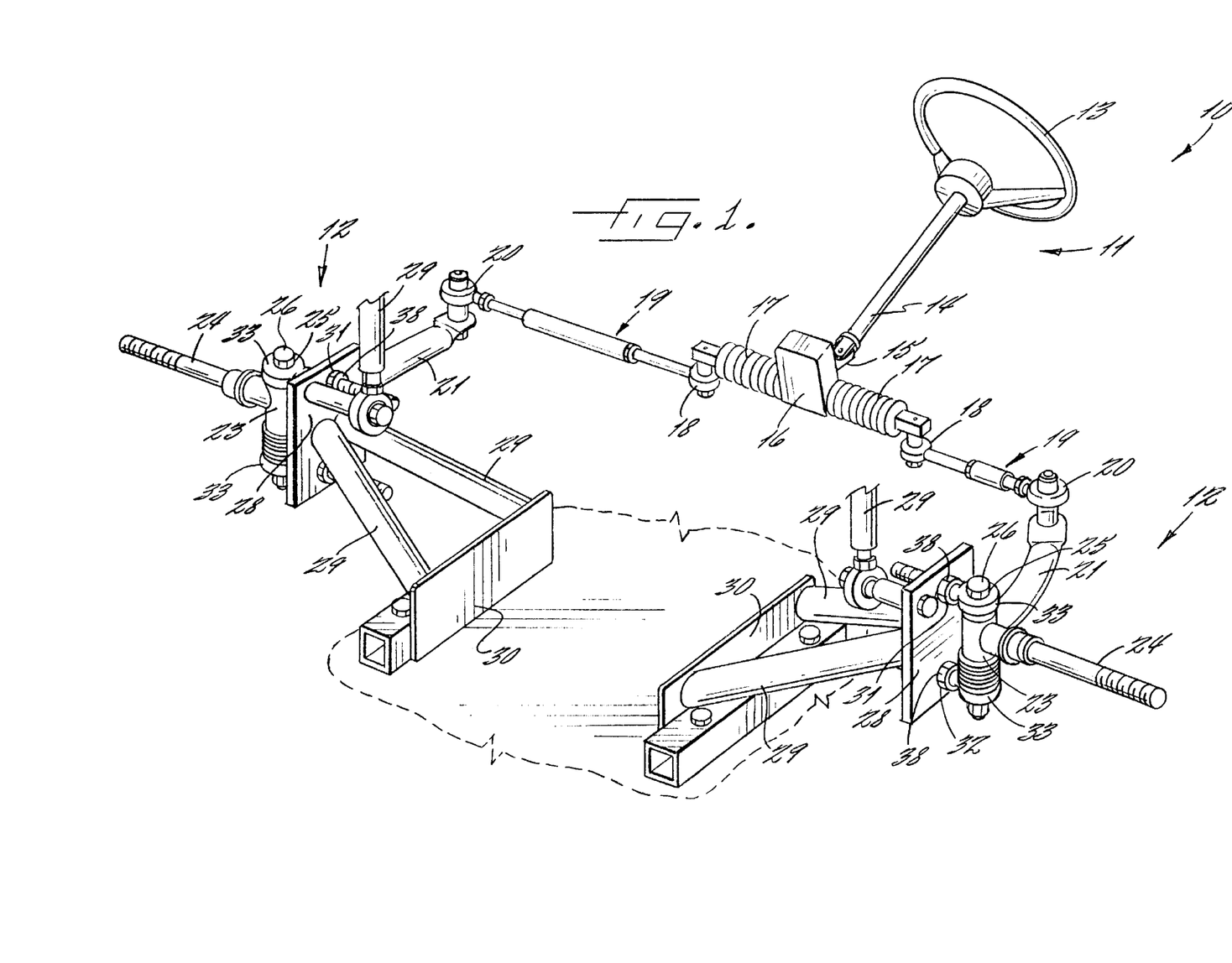
FIG. 1 is a perspective view of the steering assembly according to the present invention.

The steering arrangement 11 includes a steering wheel 13 supported by a steering column 14. The steering column 14 terminates at a universal joint 15. The universal joint 15 connects the steering column 14 with a steering mechanism, shown generally at 16, such as a combination of steering gears. A pair of bellows 17 extend from either side of the steering column 14. A joint 18 connects the rack (not shown) positioned within the bellows 17 to the tie rod assemblies 19. Accordingly, rotational movement applied to the steering wheel 13 is translated to the tie rod assembly 19 for turning the vehicle tires (not shown). It is within the scope of the present invention, however, to provide an alternative steering arrangement, for example, a rack and pinion steering arrangement.

Figure 2:
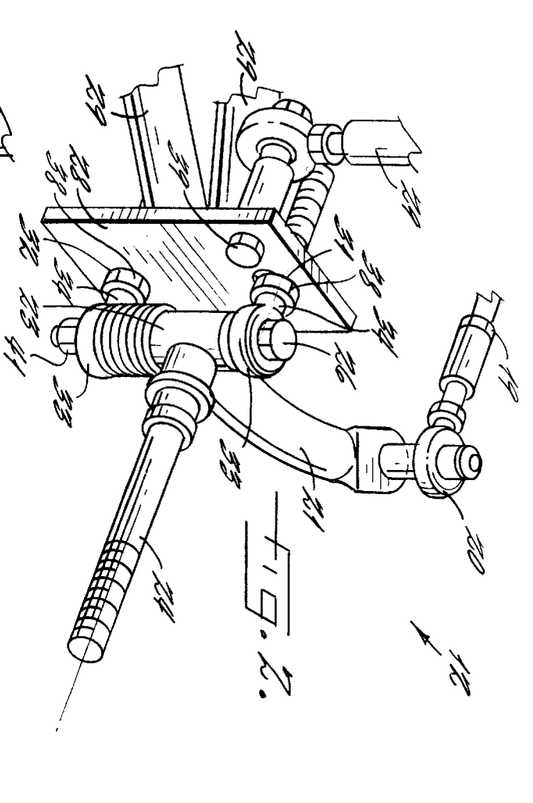
FIG. 2 is an enlarged, perspective view of the steering alignment arrangement thereof.
Figure 3:
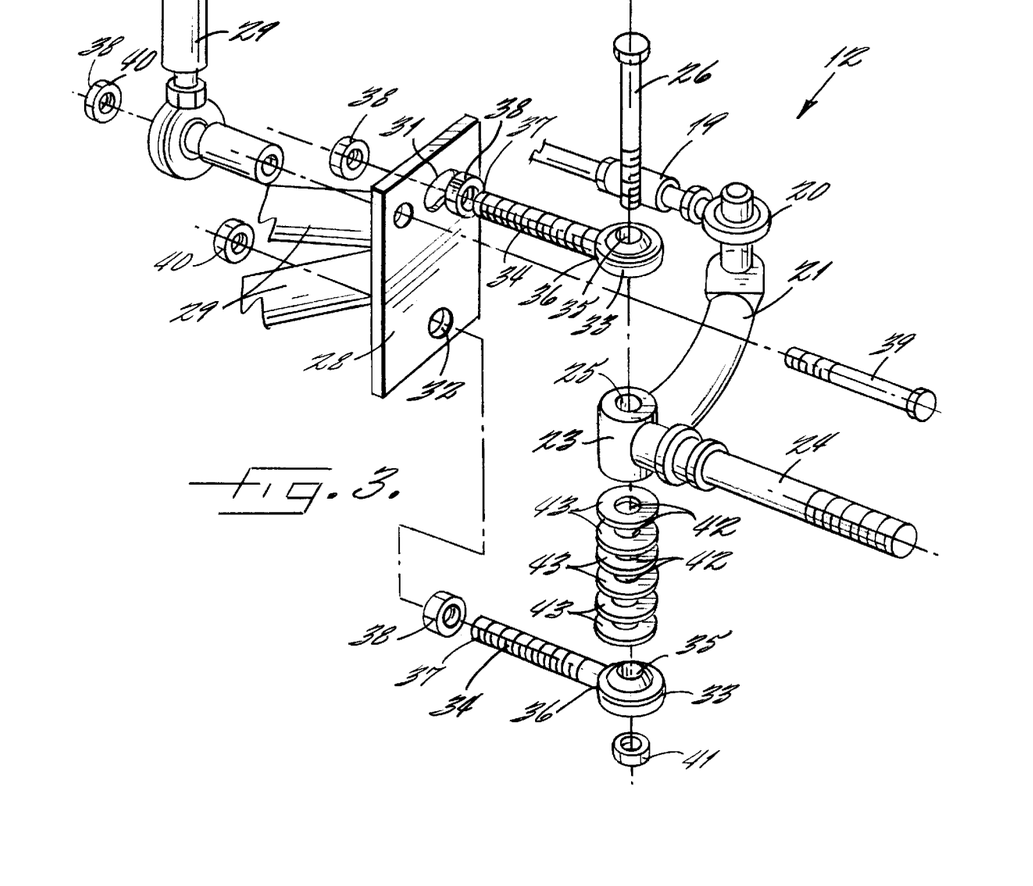
FIG. 3 is an exploded view of the steering alignment arrangement illustrated in FIG. 2.

A steering alignment arrangement 12 is associated with each tie rod assembly 19. For the sake of discussion, one alignment arrangement 12 will be discussed but it is to be appreciated that the description may equally apply to a pair of alignment arrangements 12. The steering alignment arrangement 12 includes a first joint 20 which connects the tie rod assembly 19 of the steering arrangement 11 to a rotating arm 21. The rotating arm 21 is connected to a steering spindle 23 having an outwardly extending tire axle 24. The tire axle 24 supports a vehicle tire (not shown) thereon. The steering spindle 23 defines a steering spindle bore 25 configured to receive a kingpin 26. The steering spindle 23 is connected to a mounting bracket 28.

The mounting bracket 28 is connected to the vehicle chassis by a plurality of supports 29. Accordingly, the mounting bracket 28 is fixedly secured to the vehicle chassis such as by supporting members 30 as illustrated in FIG. 1. The mounting bracket 28 defines at least one aperture, and as illustrated, an upper 31 and lower aperture 32. At least one joint 33 is positioned either above or below the steering spindle 23 and, preferably, adjacent both the upper and lower ends as illustrated in FIGS. 2 and 3. The joints 33, preferably, are a spherical rod end joint often referred to as a heim joint. The joints 33 each define a central bore 35 which are co-axially positioned with the steering spindle bore 25 wherein the kingpin 26 extends through the joint central bore 35 and the steering spindle bore 25.

A stem 34 extends outwardly from each of the heim joints. The stem 34 includes a proximal end 36 and a distal end 37. See FIG. 3. The proximal end 36 is connected to the respective joint 33. The mounting bracket apertures 31, 32 receive the distal ends 37 of the stems 34. A securing member 38 is provided for securing the stem 34 in the selected position relative to the mounting bracket 28. Preferably, the stem 34 is threaded and the securing member 38 is a matingly threaded member. As illustrated in FIGS. 2 and 3, the securing member 38 includes a pair of threaded nuts 40 which are positioned on opposing sides of the mounting bracket 28 and which threadably engage the preferably threaded stem 34. A further threaded member 39 is provided to secure the mounting bracket 34 to the vehicle chassis via a nut 40 as represented in FIG. 3.

Figure 4:
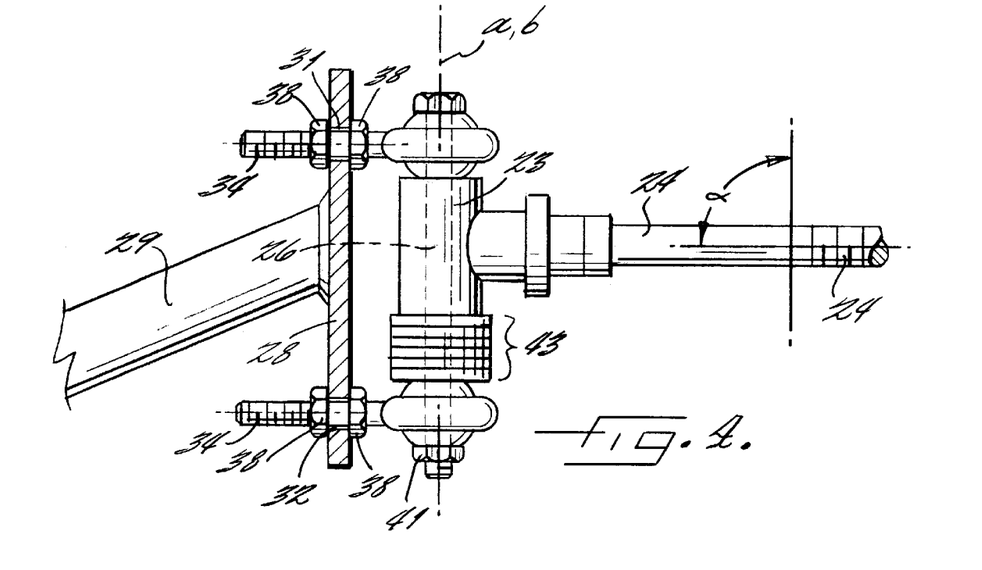
FIG. 4 is an elevational view of the steering alignment arrangement wherein the vehicle tire axle has a predetermined camber.

Preferably, the kingpin 26 also includes a threaded lower portion wherein the kingpin 26 may be inserted into the co-axially arranged joint bores 35 and the steering spindle bore 25. A fastening member 41 such as a threaded nut may be used to secure the steering alignment arrangement 12. The camber of the steering alignment arrangement 12, according to the present invention, may be readily and easily adjusted. FIG. 4 represents the steering assembly 10 according to the present invention having a neutral or zero camber. Camber is the amount that the vehicle tire tilts in (negative) or out (positive) at the top, when viewed from the front of the vehicle. The angle α represented in FIG. 4 therefore represents a zero camber as the vertical axis a is coextensive with the central axis b of the kingpin 26. Positive and negative camber results by tilting the central axis b of the kingpin 26.

Figure 5:
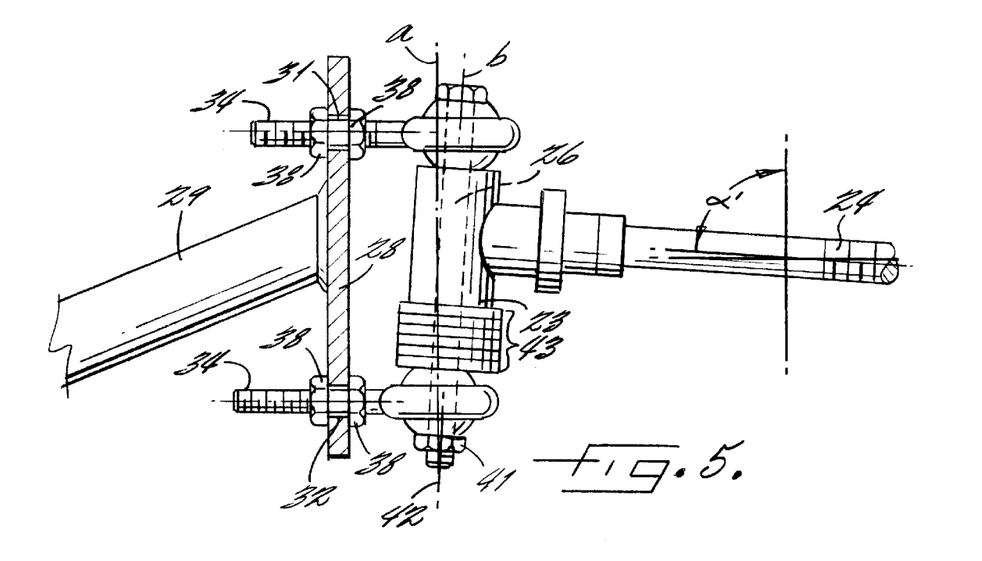
FIG. 5 is a representation of the steering alignment arrangement wherein the vehicle tire axle has a different camber.

This is achieved by altering the distance of the stem 34 between the joint 33 and the mounting bracket 28. The securing members 38 are loosened on opposing sides of the mounting bracket 28 and the stems 34 are extended or retracted within or out of the mounting bracket apertures 31, 32. According to the preferred embodiment wherein a pair of joints 33, stems 34, and mounting bracket apertures 31, 32 are provided, the upper stem 34 may be extended and the lower stem 34 retracted relative to the mounting bracket 28 to provide positive camber as represented by angle α' in FIG. 5. Thus, the kingpin central axis b extends angularly to the vertical axis a as represented in FIG. 5. Alternatively, negative camber (not shown) may be achieved by positioning the upper and lower stems in reverse. That is, shortening the length of the stem 34 between the upper joint 33 and the mounting bracket 28 and lengthening the length of the stem 34 between the lower joint 33 and the mounting bracket 28. Once a desired camber is achieved, the securing members 38 may be secured. Thus, the camber of the steering assembly 10 may be easily adjusted without requiring any specialized equipment and may be readily adjusted at any location, even during or at a racing event.

It is within the scope of the present invention, however, to utilize variant means of adjusting the length of the stem between the mounting bracket and second joint. For instance, telescoping members (not shown) may be employed. Likewise, it is within the scope of the present invention to employ only one stem and one second joint. For instance, only an upper second joint and associated stem may be provided wherein the lower end of the steering spindle is stationary relative to the mounting via a pivoting connection (not shown).

Figure 6:
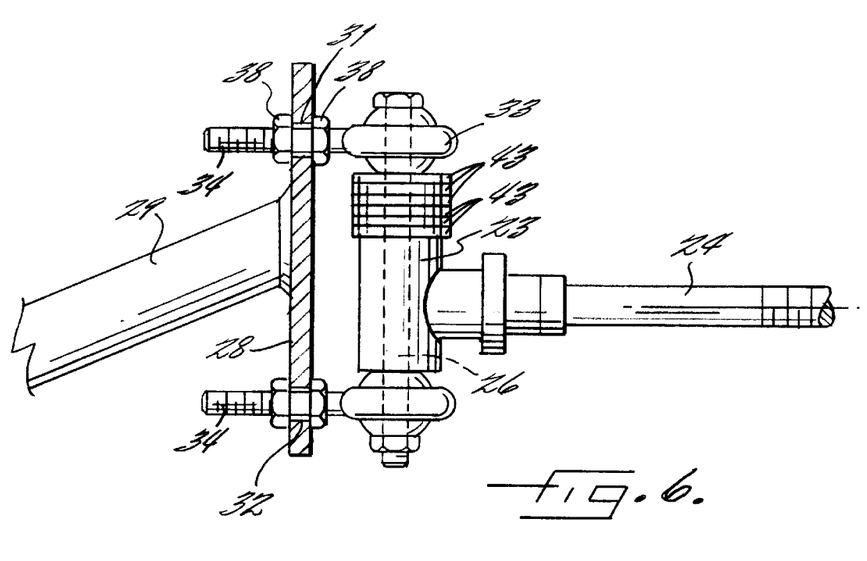
FIG. 6 is a side elevational view of the steering alignment arrangement wherein the vehicle tire axle has an adjusted suspension height.

The steering alignment assembly 12 according to the present invention also provides means to easily adjust the suspension height of the assembly 10 by adjusting the position of the steering spindle 23, and hence the tire axle 24, along the central axis b of the kingpin 26. The suspension height is defined as the distance measured from a specific point on the body frame or suspension to the ground. For instance, FIG. 4 represents the alignment arrangement 12 having a first suspension height and FIG. 6 represents the alignment arrangement 12 having a second and lower suspension height. At least one spacer 43 is provided which may be positioned between the joint 33 and the steering spindle 23 at either its upper or lower end. Preferably, a plurality of spacers 43 are provided so that a greater number of varying suspension heights may be achieved. Preferably, the spacers include an aperture 42 for receiving the kingpin 26 wherein the spacers 43, such as in the form of a washer as represented in the various figures, may be positioned about the kingpin 26. Accordingly, any number of spacers 43 may be positioned above or below the steering spindle 23 between the steering spindle 23 and the adjacent second joint 33 to provide varying suspension heights. It is also within the scope of the present invention to provide a plurality of spacers, each having a different size for use with the alignment arrangement according to the present invention.

The caster of the steering alignment assembly 12 is also adjustable. According to a preferred embodiment, the mounting bracket 28 defines an adjustable seat which, as illustrated, is the upper mounting bracket aperture 31. The lower aperture 32 may likewise constitute an adjustable seat but for the sake of discussion, reference will be made to the upper aperture 31.

The adjustable seat 31 of the mounting bracket is configured to receive a respective stem 34.

Figure 7:
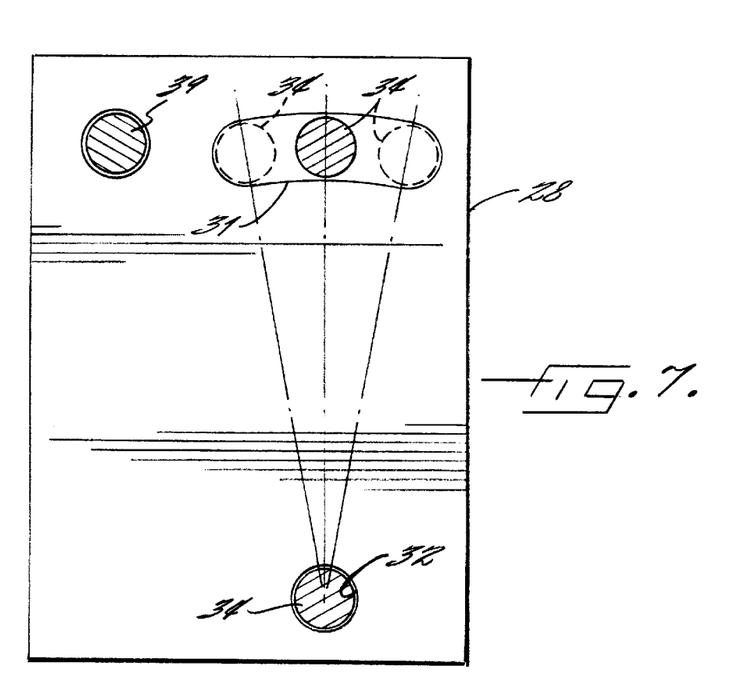
FIG. 7 is a front elevational view of the steering alignment arrangement illustrating an adjustable camber.

As illustrated, the adjustable seat 31 is a substantially elongate and substantially kidney-shaped aperture 31 for receiving the distal end 37 of the stem 34. The aperture 31 is preferably kidney-shaped to include an arcuate top and bottom wherein the concavity of each faces the lower aperture 32. This provides a constant distance between the upper and lower stems regardless of the selected caster. This is best illustrated in FIG. 7. The caster is adjusted by moving the distal portion of the stem 34 along the length of the kidney-shaped aperture 31 in a substantially horizontal direction (albeit it will actually move arcuately due to the connection of the lower stem 34 to the mounting bracket 28). Once the desired caster is achieved, the securing members may be utilized to secure the stem 34. FIG. 7 illustrates this concept. The stem 34 shown in solid lines represents a neutral or zero caster. To the right of the stem 34 in sold lines is a stem 34 shown in phantom. This stem 34 represents negative caster. The stem 34 shown in phantom to the left of the stem 34 in solid lines depicts positive camber. In either instance, the distance between the upper and lower stems 34 remains constant. Three castor positions are illustrated in FIG. 7. It is within the scope of the present invention, however, to provide any number of caster positions.

While particular embodiments of the invention have been described, it will be understood, of course, the invention is not limited thereto since modifications may be made by those skilled in the art, particularly in light of the foregoing teachings. It is therefore, contemplated by the appended claims to cover any such modifications that incorporate those features of these improvements in the true spirit and scope of the invention.

That which is claimed:

1. A steering alignment arrangement having an adjustable camber for supporting a vehicle tire comprising:
   a steering spindle defining a steering spindle bore;
   a mounting bracket for supporting said steering spindle;
   a tire axle extending outwardly from said steering spindle for supporting a vehicle tire thereon;
   a kingpin extending through said steering spindle bore and having a central axis; and
   a pair of stems, each stem having a predetermined length extending substantially perpendicular to said mounting bracket and having a proximal end extending from said kingpin and a portion of a distal end extending from said mounting bracket and wherein the length of each of said stems between said mounting bracket and said kingpin is adjustable to position the kingpin in a variant position wherein said kingpin axis is angularly positioned relative to a vertical axis to alter the camber of the steering assembly.

2. A steering alignment arrangement according to claim 1 further comprising at least one joint positioned adjacent an end of said steering spindle bore, said joint defining a bore coaxially positioned with said steering spindle bore wherein said proximal end of said stem is connected to said at least one joint and said kingpin extends through said joint bore and said steering spindle bore.

3. A steering alignment arrangement according to claim 2 wherein said at least one joint is positioned adjacent an upper end of said steering spindle.

4. A steering alignment arrangement according to claim 1 wherein said mounting bracket defines an aperture and a portion of said stem adjacent the distal end thereof extends through said aperture wherein the length of said stem extending between said mounting bracket and said steering spindle is adjustable by extending and retracting said stem through said mounting bracket aperture.

5. A steering alignment arrangement according to claim 4 comprising a securing member for securing said stem in a selected position relative to said mounting bracket.

6. A steering alignment arrangement according to claim 5 wherein said stem is threaded and said securing member is a matingly threaded member.

7. A steering alignment arrangement according to claim 6 comprising a pair of said threaded securing members, one each positioned on said stem adjacent opposing sides of said mounting bracket.

8. A steering alignment arrangement according to claim 2 wherein said at least one joint is a spherical rod end joint.

9. A steering alignment arrangement according to claim 2 comprising a pair of said joints, one positioned adjacent an upper end and one positioned adjacent a lower end of said steering spindle with the proximal end of each of said stems connected to an associated joint.

10. A steering alignment arrangement according to claim 9 wherein said mounting bracket defines a pair of apertures and a portion of each stem adjacent each distal end thereof extends through a respective one of pair of mounting bracket apertures wherein the length of each said stem extending between said mounting bracket and said second joint is adjustable by extending and retracting each of said stems through the respective mounting bracket aperture.

11. A steering alignment arrangement according to claim 10 wherein each of said pair of joints is a spherical rod end joint.

12. A steering alignment arrangement according to claim 1 wherein the position of said steering spindle along the central axis of said kingpin is adjustable to provide an adjustable suspension height.

13. A steering alignment arrangement according to claim 12 comprising at least one spacer which is selectively positioned between said at least one joint and said steering spindle to selectively adjust the suspension height of said steering alignment arrangement.

14. A steering alignment arrangement according to claim 13 wherein said spacer includes an aperture and said kingpin is received within said spacer aperture.

15. A steering alignment arrangement according to claim 13 comprising a plurality of said spacers to provide a plurality of suspension height positions.

16. A steering alignment arrangement according to claim 1 wherein said mounting bracket includes an adjustable seat for receiving at least a portion of said at least one stem wherein said mounting bracket defines a plurality of positions for receipt of said at least one stem and wherein the steering alignment arrangement has a caster which is adjustable by selectively positioning said at least one stem within said adjustable seat.

17. A steering alignment arrangement having an adjustable suspension height for supporting a vehicle tire comprising:

a steering spindle defining a steering spindle bore;
a mounting bracket for supporting said steering spindle;
a tire axle extending outwardly from said steering spindle for supporting a vehicle tire thereon;
a kingpin extending through said steering spindle bore and having a central axis;
at least one joint positioned adjacent said steering spindle bore connecting said steering spindle to said mounting bracket; and
at least one spacer removably positioned about said kingpin, between said steering spindle and said at least one joint wherein said spacer is selectively positioned adjacent at least one end of said steering spindle to selectively position said tire axle along the central axis of said kingpin to adjust the suspension height of the steering assembly.

18. A steering alignment arrangement according to claim 17 comprising at least one stem extending perpendicularly through said mounting bracket and having a distal and proximal end wherein said proximal end is connected with said at least one joint and said distal end is associated with said mounting bracket.

19. A steering alignment arrangement according to claim 17 wherein said spacer includes an aperture and said kingpin is received within said spacer aperture.

20. A steering alignment arrangement according to claim 19 comprising a plurality of said spacers to provide a plurality of suspension height positions of said tire axle.

21. A steering alignment arrangement according to claim 17 further comprising at least one stem having a predetermined length extending substantially perpendicular to said mounting bracket and having a proximal end associated with said steering spindle and a distal end associated with said mounting bracket and wherein the length of said stem between said mounting bracket and said steering spindle is adjustable to position the kingpin in a variant position wherein an axis of said kingpin is angularly positioned relative to a vertical axis to alter the camber of the steering assembly.

22. A steering alignment arrangement according to claim 17 wherein said mounting bracket includes an adjustable seat for receiving at least a portion of said at least one stem wherein said mounting bracket defines a plurality of positions for receipt of said at least one stem and wherein the steering alignment arrangement has a caster which is adjustable by selectively positioning said at least one stem within said adjustable seat.

23. A steering alignment arrangement having an adjustable caster for supporting a vehicle tire comprising:

a steering spindle defining a steering spindle bore;
a mounting bracket for supporting said steering spindle, said mounting bracket having an adjustable seat;
a tire axle extending outwardly from said steering spindle for supporting a vehicle tire thereon;
a kingpin extending through said steering spindle bore and having a central axis;
at least one stem having a predetermined length extending substantially perpendicular to said mounting bracket and having a proximal end associated with said kingpin and a distal end supported by said mounting bracket adjustable seat wherein said mounting bracket adjustable seat receives said stem in a plurality of positions to adjust the caster of the vehicle tire by moving said kingpin wherein its central axis extends angularly with respect to a vehicle axis.

24. A steering alignment arrangement according to claim 23 wherein said mounting bracket adjustable seat is an aperture defined by said mounting bracket and a portion of said at least one stem adjacent the distal end thereof extends through said aperture.

25. A steering alignment arrangement according to claim 24 wherein said adjustable seat is defined by an elongate aperture wherein the length of said aperture extends substantially along a horizontal axis.

26. A steering alignment arrangement according to claim 25 wherein said elongate aperture includes a substantially arcuate bottom.

27. A steering alignment arrangement according to claim 25 wherein said elongate aperture includes a substantially arcuate top so as to define a substantially kidney-shaped seat for said at least one stem.

28. A steering alignment arrangement according to claim 23 further comprising a pair of said stems wherein said mounting bracket further defines a second aperture wherein a portion of one of said pair of stems adjacent the distal end thereof is associated with said mounting bracket seat and a portion of another of said pair of stems adjacent the distal end thereof is associated with said second aperture wherein the stem associated with said adjustable mounting seat is adjustable in a substantially horizontal direction wherein the distance between said pair of stems remains substantially constant.

29. A steering alignment arrangement according to claim 28 wherein said adjustable mounting seat is defined by an elongate aperture having an arcuate top and bottom.

30. A steering alignment arrangement according to claim 3 wherein said stem has a length and the length of said stem between said mounting bracket and said steering spindle is adjustable to position the kingpin in a variant position wherein said kingpin axis is angularly positioned relative to a vertical axis to alter the camber of the steering assembly.

31. A steering alignment arrangement according to claim 3 further comprising at least one joint positioned adjacent said steering spindle bore for connecting said steering spindle bore to said mounting bracket and at least one spacer removably positioned about said kingpin, between said steering spindle and said at least one second joint wherein said spacer is selectively positioned adjacent an end of said steering spindle to selectively position said tire axle along the central axis of said kingpin to adjust a suspension height of the steering assembly.

32. A vehicle steering assembly for supporting a vehicle tire comprising:

a steering arrangement; and an alignment arrangement connected to said steering arrangement, said alignment arrangement comprising a steering spindle defining a steering spindle bore, a mounting bracket for supporting said steering spindle, said mounting bracket having an adjustable seat, a tire axle extending outwardly from said steering spindle for supporting a vehicle tire thereon, at least one joint positioned adjacent an end of said spindle bore, said joint defining a bore coaxially positioned with said steering spindle bore, a kingpin extending through said steering spindle bore and said bore of said at least one joint and having a central axis wherein said steering spindle is positioned along the central axis of said kingpin and has a suspension height wherein the suspension height is adjustable by vertically moving the steering spindle along the kingpin central axis, and at least one adjustable stem having a predetermined length having a proximal end associated with said at least one joint and a distal end associated with the mounting bracket adjustable seat wherein the length of said stem between said mounting bracket and at least one joint is adjustable to position the kingpin in a variant position relative to a vertical axis wherein the kingpin central axis extends angularly to the vertical axis in a first plane to alter the camber of the alignment arrangement and wherein said distal end of said at least one stem is movable in a substantially horizontal pivotal direction to adjust the caster of the alignment arrangement by altering the central axis of said kingpin wherein said kingpin central axis extends in a second plane, transverse to said first plane, at an angle with respect to the vertical axis.

33. A steering alignment arrangement according to claim 32 further comprising at least one spacer which is selectively positioned between said at lest one joint and said steering spindle to selectively adjust the suspension height of said alignment arrangement.

34. A steering alignment arrangement according to claim 1 wherein one of said stems is positioned adjacent an upper end of said steering spindle and one of said stems is positioned adjacent a lower end of said steering spindle.

* * * * *

UNITED STATES PATENT AND TRADEMARK OFFICE
CERTIFICATE OF CORRECTION

PATENT NO. : 5,992,863

DATED : November 30, 1999

INVENTOR(S) : Forbes-Robinson et al.

It is certified that error appears in the above-identified patent and that said Letters Patent is hereby corrected as shown below:

Title page, [56] References Cited, U.S. PATENT DOCUMENTS, line 33, "Peterson" should read --Petersen--.

Column 9, lines 13-14, "claim 3" should read --claim 23--; lines 19-20, "claim 3" should read --claim 23--.

Signed and Sealed this

Eighteenth Day of July, 2000

*Attest:*

Q. TODD DICKINSON

*Attesting Officer*     *Director of Patents and Trademarks*